No. 670,774. Patented Mar. 26, 1901.
W. GARDINER.
APPARATUS FOR FORMING ELEMENTS FOR ELECTRIC ACCUMULATORS.
(Application filed Apr. 28, 1900.)
(No Model.) 2 Sheets—Sheet 1.
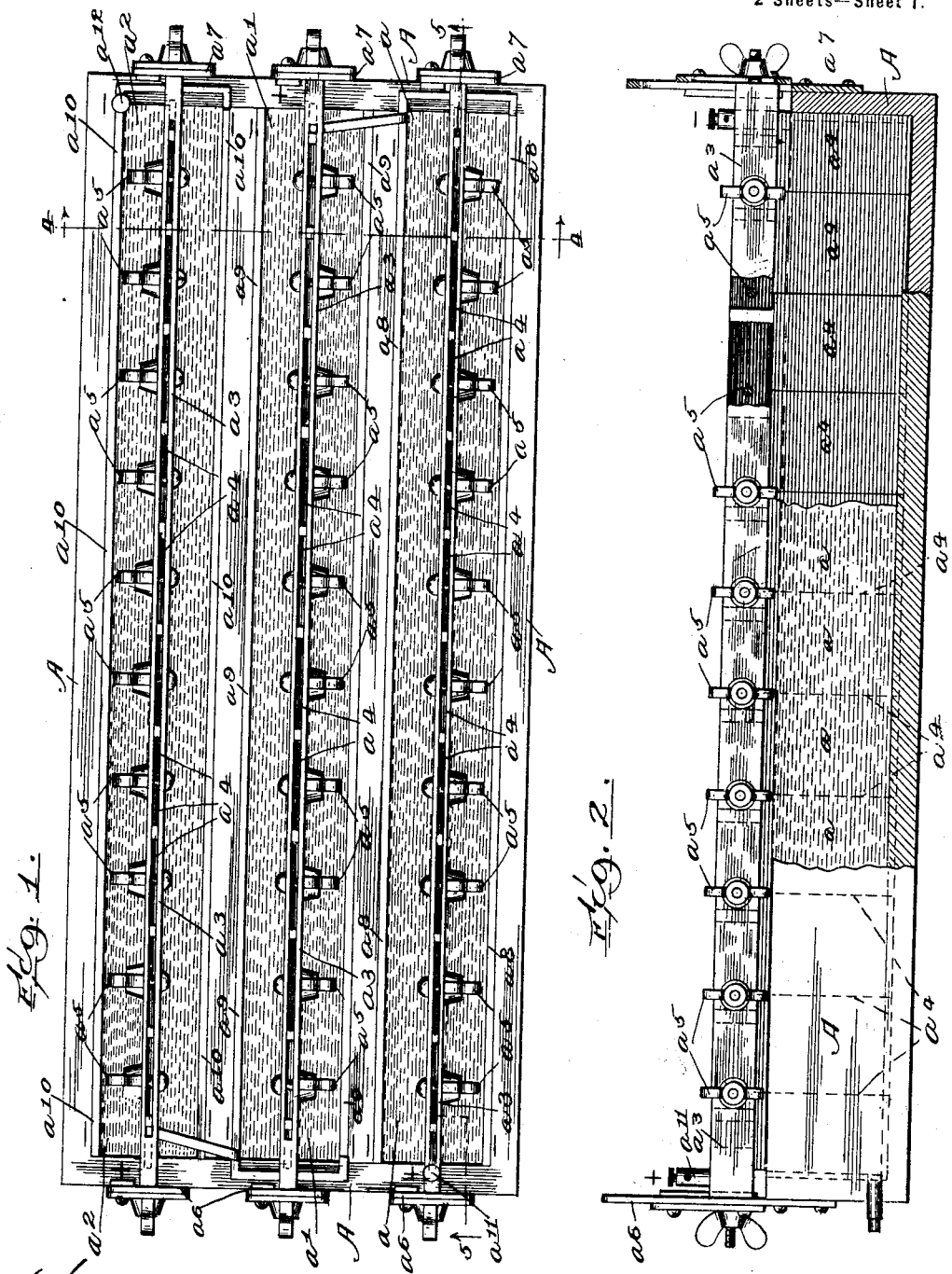

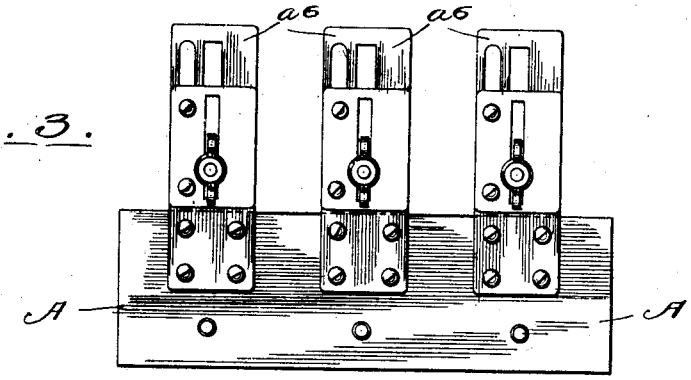
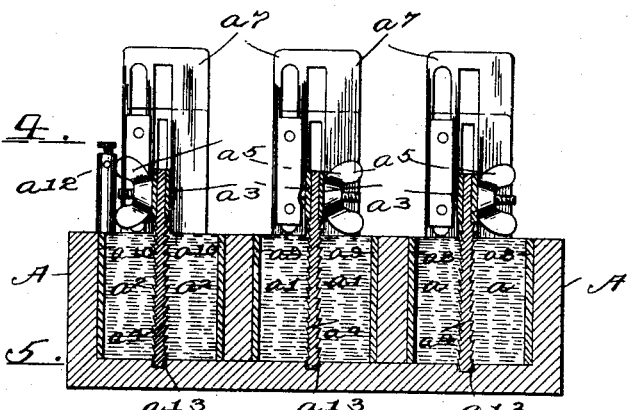
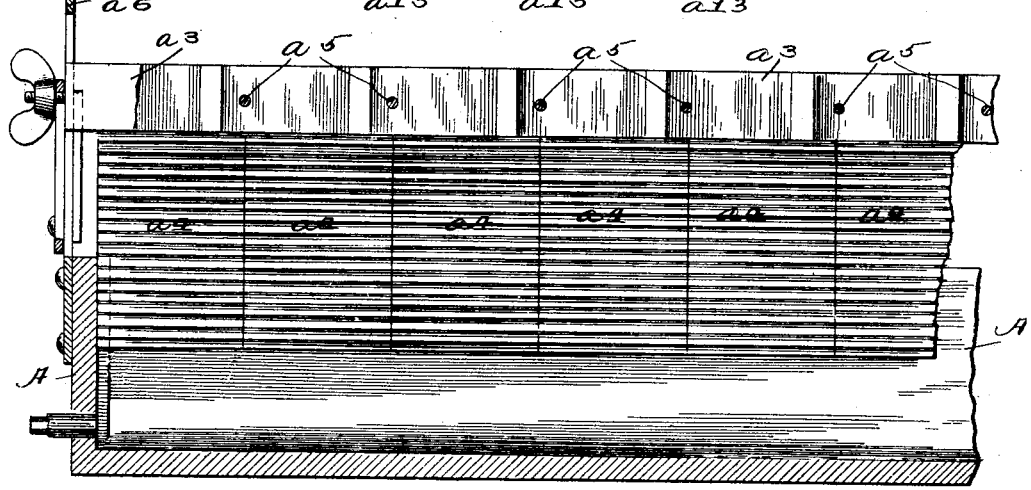

UNITED STATES PATENT OFFICE.

WILLIAM GARDINER, OF CHICAGO, ILLINOIS, ASSIGNOR TO THE HELIOS-UPTON COMPANY, OF NEW JERSEY.

APPARATUS FOR FORMING ELEMENTS FOR ELECTRIC ACCUMULATORS.

SPECIFICATION forming part of Letters Patent No. 670,774, dated March 26, 1901.

Application filed April 28, 1900. Serial No. 14,736. (No model.)

*To all whom it may concern:*

Be it known that I, WILLIAM GARDINER, a citizen of the United States, residing in Chicago, county of Cook, and State of Illinois, have invented certain new and useful Improvements in Methods of and Apparatus for Forming Elements for Electric Accumulators; and I do hereby declare the following to be a full, clear, and exact description, such as will enable persons skilled in the art to which it appertains to make and use the same.

My invention relates to an apparatus for forming the elements, to make them active, of electric accumulators. It has especial reference to a means whereby a metallic plate may be chemically formed in a suitable bath by the passage of an electric current through the said plate for that purpose. Heretofore chemically-pure lead plates have been subjected for this purpose to the effect of an electric current while in a suitable bath, but each plate has been placed in a separate bath and the plates have been connected in circuit in series and a current of a constant given strength has been passed through all of the plates during the entire time that the plates are subjected to the effect of the current. I have practiced this method; but I have found it defective in that the current, to produce the best results, should be gradually diminished as the forming process progresses. When each plate is put into a separate cell and the plates are connected, as above described, it is practically impossible to adjust the strength of the current and so maintain it to the requirements of each plate, so as to produce the most efficient results. The variation in the character of the plate, the materials used in its construction, and the differences that may exist in the various baths into which the plates undergoing the forming process are placed will operate to cause some of the plates to become fully formed before some of the others. In this event the former may be injured by overforming, with the result that so much of the metal lead structure has been chemically converted into a granular form as to leave an insufficient amount to properly support the plate and to electrically carry the current from the active surface. The effect of undercharging is that there is not a sufficient active surface and too much metallic lead remains in the plate. My device for forming the plates consists in means for placing all of the plates to be formed in a parallel circuit and in a single bath—that is, in a bath common to all of the plates and in circuit so arranged that each plate is in a separate independent circuit. When the plates are first placed, as above, in a bath, with proper negative electrodes opposing, they are electrically inert—that is to say, they have not the power to produce an electrical difference of potential, from which effect an electric current would flow, because they are both (the plates and the dummy) in the same state of electric potential, being preferably composed of the same metal. If some chemical change takes place upon the surface of the plates or the negative-forming electrodes, then they are not of the same state of electric potential, and a current would flow when their exterior terminals are brought together, or there is set up by this effect a state of potential, a condition to produce a current. This tendency to produce a current will be in a direction counter to the prime or forming current and will increase in electromotive force as the forming process continues until the counter electromotive force equals the prime electromotive force, at which time current will cease to flow from the prime source through such a plate. As the counter electromotive force will gradually increase as the forming process increases the current will thereby be just as gradually decreased until the equilibrium is reached.

In the drawings, Figure 1 is a plan view of three tanks, each tank containing a number of plates. Fig. 2 is a side view of same, broken away to show the various plates. Fig. 3 is an end view of Fig. 1. Fig. 4 is a section through lines 4 4 of Fig. 1. Fig. 5 is a similar view to that of Fig. 2, showing the plates partly raised for conveniently connecting them to the common conductor and for inserting them in the tank.

In all of the views the same letters indicate corresponding parts.

A is a tank divided into a series of compartments $a$ $a'$ $a^2$. A compound bar $a^3$ is adapted to hold a number of plates $a^4$ by means of screws $a^5$. The bar is supported adjustably at either end of the tank by vertical pieces $a^6$ and $a^7$. The tanks may be lined on either side with sheet-lead $a^8$ $a^9$ $a^{10}$, comprising the forming or negative electrodes. When the three tanks are to be connected in serial circuit with respect to themselves, the connections are as shown in Fig. 1, in which $a^{11}$ and $a^{12}$ are the positive and negative terminals of the system. For the purpose of holding the plates firmly in position in the bottom of the tank I cut a channel or groove $a^{13}$, into which the plates enter when the bar $a^3$ has been properly lowered. It is important that the channel shall be in the longitudinal center of the tank and that the plates $a^4$ shall be held in vertical position above, so that the action will be equal on both sides of the plate. The plate being held firmly at the bottom and top there will be no danger of the plates buckling or becoming distorted.

The use and operation of my method and apparatus are as follows: The plates are placed between the bars $a^3$, as shown in Fig. 5. They are then lowered into the tank until their lower edges enter the groove $a^{13}$. The clamps on the bar are then tightened, the voltage of a constant potential dynamo is then adjusted to a suitable electromotive force, the positive pole is connected to the plate to be formed, and the negative terminal to the temporary or negative-forming electrode. As the forming process progresses the plates will begin to develop a counter electric capacity and will produce an electromotive force counter to that of the prime electromotive force and the current that will flow through such a circuit according to ohms law will be $$\frac{E - e}{R} = c,$$

in which E is the prime electromotive force, $e$ the counter electromotive force, and R the resistance of the circuit. The nearer $e$ approaches E in valve the smaller $c$ will become. Therefore if $e$ is the result of the forming process and will equal E when the plate is fully formed then no current will flow through the plate, and the plate thus becomes its own regulator. When all of the plates have become fully formed, very little, if any, current will flow in the circuit just described.

I am aware that the electrodes for accumulators are connected in parallel circuit, wherein all of the plates of a given polarity are connected together and are placed in the charging-bath with plates or electrodes of opposite polarity intervening, as when they are piled for use. I do not claim such an arrangement of plates or electrodes, especially when they are so disposed for the purpose of charging and discharging and when they are surrounded with an electrolyte especially suitable for that purpose.

Having described my invention, what I claim as new, and desire to secure by Letters Patent of the United States, is—

1. An apparatus for forming plates of electric accumulators, to make them active, comprising a tank, temporary, negative electrodes fixed therein, a means for securing a series of unformed plates arranged midway between said fixed, negative electrodes, an electrical conducting-bar suspended above said tank to which said inactive plates are attached, a guide at each end of the tank, for supporting said bar, and a means for adjustably securing said bar to said guides, whereby the said inactive plates are supported in said tank, substantially as set forth.

2. An apparatus for forming plates for electric accumulators, comprising a long, narrow tank, forming negative electrodes along the side walls thereof, a bar provided with fastenings for the battery-plates, said bar placed at the top of said tank over a vertical line an equal distance from said dummy electrodes, a groove, or guide, in the bottom of said tank for said battery-plates, guides on the ends of said tank and fastenings on the ends of said bar, for engaging with said guides, said guides adapted to support said bar and plates in position, substantially as set forth.

In testimony whereof I have signed this specification, in the presence of two subscribing witnesses, this 26th day of April, 1900.

WILLIAM GARDINER.

Witnesses:
  WM. HOOD,
  M. F. ALLEN.